Aug. 7, 1962    K. N. BROWN    3,048,469
METHOD OF MANUFACTURING SOLUBLE SILVER SALTS
Filed Dec. 22, 1958
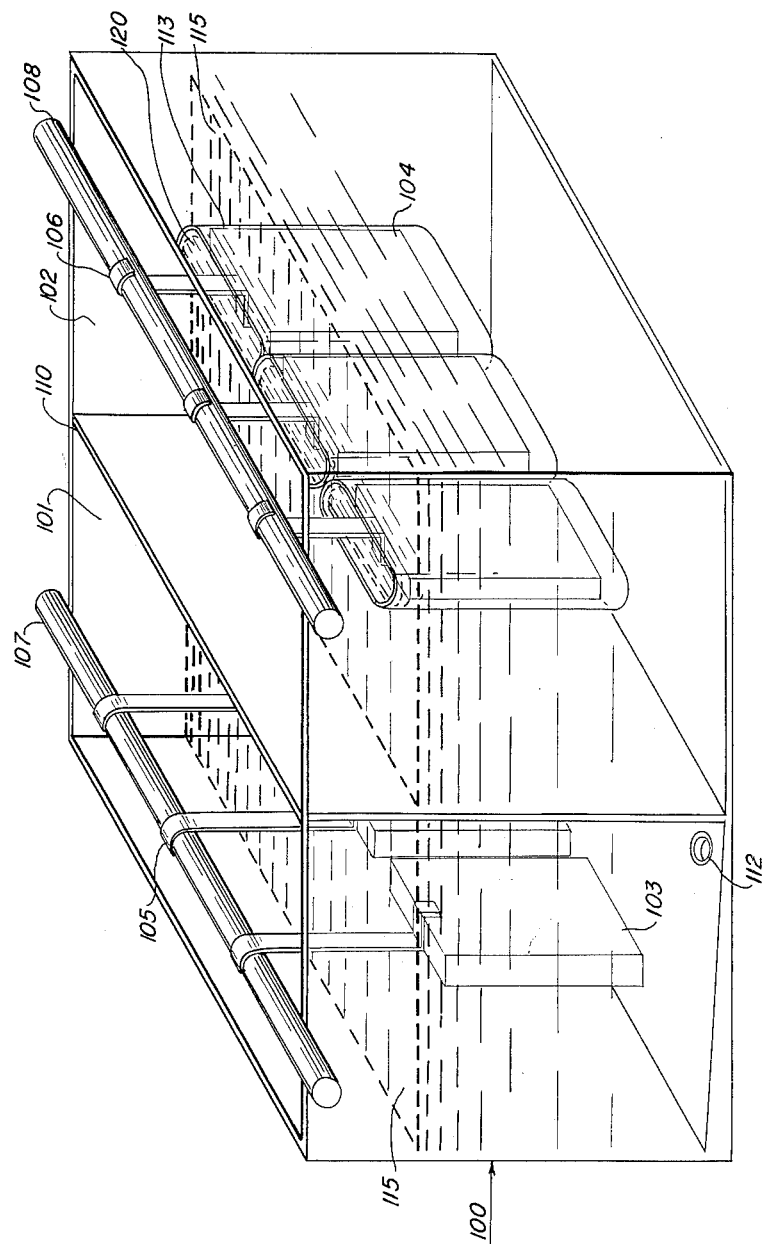
INVENTOR:
KENNETH N. BROWN
BY
AGENT UnitedStates Patent Office 3,048,469
Patented Aug. 7, 1962

3,048,469
METHOD OF MANUFACTURING SOLUBLE
SILVER SALTS
Kenneth N. Brown, Teaneck, N.J., assignor to Yardney
International Corp., New York, N.Y., a corporation of
New York
Filed Dec. 22, 1958, Ser. No. 782,102
3 Claims. (Cl. 23—50)

This invention relates to silver salts and more particularly to a process for the preparation of argentous salts. This application is a continuation-in-part of my application Ser. No. 759,554, filed September 8, 1958, now Patent No. 3,003,935.

The general object of this invention is to provide an improved process for the manufacture of high-purity silver salts in an economical and expeditious manner.

Fundamentally, this invention involves the anodic precipitation of silver oxide from conductive solutions in which silver oxide is insoluble and with which it does not react chemically, followed by the reactions of the washed silver-oxide slurry to form salts.

The invention will be more particularly described with reference to the accompanying drawing the sole FIGURE of which diagrammatically shows an apparatus useful for manufacturing a silver oxide from which high-purity salts are prepared.

The plating tank 100 illustrated may be any suitable vessel divided into two compartments, including an anode compartment 101 and a cathode compartment 102, separated from each other by a porous electrolyte-permeable separator membrane 110.

The anode compartment 101 contains the silver anode 103 suspended in the electrolyte 115″. The anode 103 is connected to a current-carrying bus bar 107 via anodic bus leads 105. The anode 103 should be spaced from the bottom of the compartment with clearance sufficient to permit collection of silver oxide.

Within the cathode compartment 102 is suspended a stainless-steel or other inert cathode 104 which is connected to bus bar 108 via cathodic bus leads 106. Each of the cathodes is surrounded by a porous electrolyte-permeable cathode cup 113, the top of which protrudes above the level 115′ of the electrolyte 115 in the cathode compartment. Within each of the cathode cups 113 a second electrolyte 120 is contained. This electrolyte is maintained at a level 116 above the electrolyte level 115′ existing in the main cathode compartment.

The anode compartment may preferably be constructed with a sloping bottom to permit the accumulation and collection of the precipitated silver oxide; at the lowest point of the sloping bottom of this compartment a valve arrangement 112 is provided to permit the removal of the collected silver oxide. The silver oxide is separated from the electrolyte which flushes it through the valve by means of filter, centrifuges or the like (not shown).

Referring now specifically to the cathode portion of the tank, it is preferred that the second electrolyte in the cathode-enveloping cup should be maintained at a level at least 1 centimeter above the electrolyte level in the main tanks. As a result of this positive hydrostatic head, the flow of liquid through the electrolyte-permeable membrane inhibits the migration of the anions through the porous cathode cup 113 from the main tank. They are, therefore, kept away from close proximity to the reducing conditions in effect at and near the surface of the cathode. This prevents reduction of nitrates to ammonia and possible reduction of acetates.

In addition, the cathode cup 113 confines hydrogen, which is liberated at the cathode, to this small area and prevents the reduction and/or decomposition of nitrogenous anions present in the first electrolyte, which might be reduced if the hydrogen were not so confined.

The first or prime electrolyte 115 consists of an aqueous solution of salts of alkalis. The salts are those whose anions form soluble silver compounds. Preferred salts of this type include sodium nitrate and sodium acetate. In general, it is preferred to maintain the salt content of the solution at that concentration which affords the highest conductivity. It has, however, been found that the silver oxide may be prepared from electrolytes containing sodium nitrate from concentrations of 2% up to the limit of solubility.

The second electrolyte 120 may be any alkali, but sodium and potassium hydroxide are preferred by reason of their solubility and cheapness.

The silver oxide prepared in this way is particularly free from contamination and has only an extremely small amount of adhering soluble salts; the latter are easily washed free from the oxide. This is in contrast to the recrystallization procedures necessary to free other argentous starting material from impurities.

The silver oxide is then reacted with the anion needed to form the desired salt. When it is desired to form soluble silver salts, the concentrated acid of the salt is reacted in stoichiometric proportion with the silver oxide and the soluble product is filtered off. Because of the extreme reactivity of the silver oxide that is electrochemically prepared by the means set forth, it is not necessary to resort to a stoichiometric excess of the acid, and aside from the removal of the water used or formed in the reaction no further purification is necessary. Among the soluble silver salts that may be prepared in the above fashion by the reaction of the appropriate acid with the electrochemically precipitated silver oxide, there may be mentioned the inorganic salts such as nitrate, acetate, chlorate, perchlorate, fluosilicate and the organic soluble salts including acetate, alginate, glucuronate, pectinate, fluogallate, lactate, propionate, tartrate, and salicylate, all derived from the corresponding acids.

For the preparation of the insoluble compounds, the silver oxide is reacted with an excess of the desired acid in soluble form or in an acidified medium. After digestion of the reaction mixture, the liquid is filtered off and the precipitate is treated with a dilute acid which will form a soluble silver salt with any unreacted silver oxide and which will not decompose the insoluble silver salt previously formed. The reaction between the relatively insoluble oxide and the dilute acid proceeds rapidly to virtual completion by reason of the extreme reactivity of the electrolytically prepared silver oxide. The final acid leach removes any unreacted silver oxide. Silver halides and other photosensitive silver salts have been prepared by this method and are then used for the preparation of nitrate-free photographic emulsions. Other insoluble silver salts have also been prepared by this method.

The invention will now be more particularly described in connection with the following examples:

*Example 1*

In an apparatus as shown in the drawing, with the compartments separated by a porous cloth (Dynel) resistant to concentrated salt solutions and filled with an electrolyte compound of 10% $NaNO_3$ adjusted to a pH in the range 9–11 by the addition of NaOH, the silver was electrochemically precipitated from the surface of a cast-silver-ingot anode. The current density ranged up to 0.15 amp./cm.$^2$. The solution was not externally heated but reached an equilibrium temperature of 60° C. after ½ hour of operation. The solution was vigorously stirred, but agitation was not necessary by reason of internal agitation promoted by the current flow.

The porous cups 113 of ceramics or cellulosic fibers were filled with NaOH solution which was slowly added at a rate sufficient to maintain a slight hydrostatic head in these cups. At low and high current densities, at temperatures ranging from that of the room up to 60° C. and at pH ranges from nearly neutral to strongly alkaline, no ammonia or ammoniacal compounds could be detected by any of the common tests. It was found that the efficiency approached 100% at an anode-current density of approximately 0.15 amp./cm.$^2$.

The silver-oxide powder resulting from this process, after removal from the tank, was washed and reacted in wet-slurry form with a stoichiometric amount of nitric acid in concentrated form. The heat of the neutralization reaction concentrated the reaction product further. The concentrated reaction mixture, when the residual water was evaporated, yielded typical colorless crystals of silver nitrate exceeding the U.S.P. standards for purity.

*Example 2*

A suspension of silver oxide prepared according to Example 1 was reacted with an equimolecular amount of acetic acid. The resultant solution was boiled down to incipient crystallization, and the residual water was removed under reduced pressure to leave a deposit of silver acetate. Standard U.S.P. tests for impurities when applied to this compound show it to be free from unreacted acetic acid and impurities as assayed in the case of silver nitrate.

*Example 3*

A 25% solution of fluosilicic acid was reacted with an equivalent amount of electrolytically precipitated silver oxide prepared as set forth in Example 1 by slowly adding the silver oxide, suspended in water, to the acid. By adding the oxide to the acid it was possible to prevent the spontaneous exothermic decomposition of the oxide. Such decomposition results in the deposition of a silver mirror on the sides of the reaction vessel. Silver fluosilicate is precipitated by this process.

*Example 4*

Silver oxide prepared according to Example 1 was added to an aqueous 2% solution of alginic acid having a pH in the range 4–7. The pH was adjusted by the addition of sodium hydroxide. The mixture was maintained at a temperature between 60 and 70° C. until all of the alginic acid had reacted, transforming the reaction mixture into a dark-brown solution of silver alginate. The silver alginate was isolated from the solution by precipitation with alcohol and evaporation of the water under vacuum conditions.

*Example 5*

A slurry of silver oxide prepared according to Example 1 was added to a solution of hydrochloric acid. The resultant slurry of silver oxide and silver chloride was filtered from the reaction mixture and washed with a dilute solution of nitric acid. All of the non-reacted silver oxide was converted to soluble silver nitrate, leaving a residue of powdered silver chloride. The reaction and washing procedures having been carried out in the absence of light, a highly photo-reactive grade of silver chloride was obtained.

*Example 6*

A solution of potassium iodide buffered with a small amount of acetic acid to a pH in the range 4–6 was reacted with an excess of silver-oxide slurry prepared according to Example 1. The reaction mixture was filtered and the precipitate was washed with a 1 N solution of acetic acid and then with water. The silver-iodide precipitate prepared according to this method was found to be especially suitable for photographic emulsions useful in the infra-red region, owing to the presence of only an absolute minimum of nitrate ions.

I claim:

1. The process for preparing substantially pure soluble silver salts which comprises electrolyzing a silver anode against an inert cathode through an interposed electrolyte permeable separator in a liquid electrolyte comprising an alkaline solution of a salt having an anion which forms soluble salts with silver, maintaining at said cathode a hydrostatic pressure greater than that at said anode whereby said silver oxide is precipitated, forming a slurry of said silver oxide, reacting said slurry with an acid capable of forming the desired silver salt, and recovering said silver salt, said acid and said silver oxide being employed in substantially stoichiometric proportions.

2. A process according to claim 1 wherein the reaction product of the said silver oxide and said acid is further subjected to a drying operation to remove water.

3. A process according to claim 1 wherein said acid is selected from the group consisting of nitric, acetic, chloric, perchloric acid, fluosilicic, alginic, glucuronic, pectinic, fluogallic, lactic, propionic, tartaric and salicylic acids.

References Cited in the file of this patent

UNITED STATES PATENTS 748,609    Hunt _____ Jan. 5, 1904

OTHER REFERENCES

Mellor: "A Comprehesive Treatise on Inorganic and Theoretical Chemistry," Longmans, Green & Co., New York, N.Y., vol. 3, 1923, page 385, and vol. 8, 1928, page 595.

Jacobson: "Encyclopedia of Chemical Reactions," Reinhold Publishing Co., New York, vol. 6, 1956, pages 235 and 236.